United States Patent
Berry, II

(10) Patent No.: US 11,468,337 B2
(45) Date of Patent: Oct. 11, 2022

(54) SYSTEM AND METHODS FOR FACILITATING PATTERN RECOGNITION

(71) Applicant: PRINCETON UNIVERSITY, Princeton, NJ (US)

(72) Inventor: Michael J. Berry, II, Princeton, NJ (US)

(73) Assignee: THE TRUSTEES OF PRINCETON UNIVERSITY, Princeton, NJ (US)

( * ) Notice: Subject to any disclaimer, the term of this patent is extended or adjusted under 35 U.S.C. 154(b) by 907 days.

(21) Appl. No.: 16/301,306

(22) PCT Filed: May 13, 2017

(86) PCT No.: PCT/US2017/032571
§ 371 (c)(1),
(2) Date: Nov. 13, 2018

(87) PCT Pub. No.: WO2017/197375
PCT Pub. Date: Nov. 16, 2017

(65) Prior Publication Data
US 2019/0197410 A1 Jun. 27, 2019

Related U.S. Application Data

(60) Provisional application No. 62/335,831, filed on May 13, 2016.

(51) Int. Cl.
*G06N 3/08* (2006.01)
*G06N 3/04* (2006.01)

(52) U.S. Cl.
CPC ............ *G06N 3/088* (2013.01); *G06N 3/049* (2013.01); *G06N 3/0445* (2013.01)

(58) Field of Classification Search
CPC ............ G06N 3/08; G06N 3/088; G06N 3/04; G06N 3/049; G06N 3/0445
See application file for complete search history.

(56) References Cited

U.S. PATENT DOCUMENTS

| | | | |
|---|---|---|---|
| 9,015,093 B1 | 4/2015 | Commons et al. | |
| 10,169,720 B2* | 1/2019 | Chien | G06F 16/285 |
| 2006/0184462 A1* | 8/2006 | Hawkins | G06N 7/005 |
| | | | 706/14 |
| 2007/0192267 A1 | 8/2007 | Hawkins et al. | |
| 2015/0106310 A1 | 4/2015 | Birdwell et al. | |
| 2015/0339570 A1 | 11/2015 | Scheffler et al. | |
| 2017/0024877 A1* | 1/2017 | Versace | G06K 9/629 |

OTHER PUBLICATIONS

Woodring et al. "Semi-Automatic Time-Series Transfer Functions via Temporal Clustering and Sequencing", IEEE VGTC, 2009, pp. 8.*

(Continued)

*Primary Examiner* — Li Wu Chang
(74) *Attorney, Agent, or Firm* — Valauskas Corder LLC

(57) ABSTRACT

The present invention is directed to a system and methods by which the determination of pattern recognition may be facilitated. More specifically, the present invention is a system and methods by which a plurality of computations may be conducted simultaneously to expedite the efficient determination of pattern recognition.

17 Claims, 12 Drawing Sheets

(56) References Cited

OTHER PUBLICATIONS

Marre et al. "High Accuracy Decoding of Dynamical Motion from a Large Retinal Population", PLOS Computational Biology, 2015, pp. 25.*

Segev, R., J. Puchalla and M. J. Berry, 2nd (2006). "Functional organization of ganglion cells in the salamander retina." J Neurophysiol 95(4): 2277-2292.

Puchalla, J. L., E. Schneidman, R. A. Harris and M. J. Berry (2005). "Redundancy in the population code of the retina." Neuron 46(3): 493-504.

Ioffe, M. L. and M. J. Berry II (2016). "The Structured 'Low Temperature' Phase of the Retinal Population Code." arXiv 1608.05751v1.

Rumelhart, D. E. and D. Zipser (1985). "Feature Discovery by Competitive Learning." Cognitive Science 9: 75-112.

Kappel, D., B. Nessler and W. Maass (2014). "STDP installs in Winner-Take-All circuits an online approximation to hidden Markov model learning." PLoS Comput Biol 10(3): e1003511.

Stepp, N., D. Plenz and N. Srinivasa (2015) "Synaptic plasticity enables adaptive self-tuning critical networks." PLoS Comput Biol 11(1): e1004043.

Nikolic, D., S. Hausler, W. Singer and W. Maass (2009). "Distributed fading memory for stimulus properties in the primary visual cortex." PLoS Biol 7(12): e1000260.

Hinton, G. E. and R. R. Salakhutdinov (2006). "Reducing the dimensionality of data with neural networks." Science 313 (5786): 504-507.

Chauvin, Y. and D. E. Rumelhart (1995). Backpropagation: Theory, Architectures, and Applications.

* cited by examiner

SYSTEM AND METHODS FOR FACILITATING PATTERN RECOGNITION

CROSS REFERENCE TO RELATED PATENTS

This application claims the benefit of U.S. Provisional Patent Application 62/335,831, filed May 13, 2016, which is incorporated herein by reference in its entirety.

STATEMENT REGARDING FEDERALLY SPONSORED RESEARCH

This invention was made with government support under Grants No. EY017934 and EY014196 awarded by the National Institutes of Health, National Eye Institute (NIH-NEI) and Grant No. IIS-0613435 awarded by the National Science Foundation. The government has certain rights in the invention.

FIELD OF THE INVENTION

The present invention is directed to a system and methods of unsupervised computer learning, and, more particularly, computer learning by which the determination of pattern recognition may be facilitated in artificial neural networks.

BACKGROUND OF THE INVENTION

A variety of systems and methods have been developed over the years to collect content from which objects, behavior, and patterns may be recognized. For example, this content may include sets of camera images taken of a tourist site, video clips or music in a related theme or category, customer purchasing records accumulated across time and products, or demographic information about individuals linked to social decisions like purchasing or voting. To organize this information, humans have traditionally examined images or time series to find objects or determine behavior or patterns. However, the human analysis of imagery is typically labor-intensive, time consuming, and subject to errors. As a result, many machine-based systems and methods have been developed to assist or replace humans in such tasks.

One known system that has been developed to improve the search for and make determinations of patterns utilizes what is termed as an artificial neural network ("ANN") algorithm that conduct analyses of multiple layers. These ANN algorithms contain very large numbers of adjustable parameters that need to be set by a training process that follows particular learning rules. The most successful versions of these ANNs, also known as "deep networks", typically are trained via a process known as supervised learning. In this process, humans collate a large set of example inputs to the ANN, known as the "training set", and label each example with the correct answer. For instance, ANNs that have learned to categorize images into classes of objects, such as dogs versus cats, have been trained with thousands of examples of correctly labeled images of cats or dogs, such as in ImageNet. While such ANNs have achieved near-human performance, they require the laborious assembly of such training sets.

Artificial neural networks offer improved performance over conventional technologies in areas which include machine vision, pattern detection and pattern recognition, signal filtering, data segmentation, data compression, data mining, system identification and control, optimization and scheduling, and complex mapping.

One broad class of ANNs having a structure that allows them to be trained with unsupervised learning. In this case, a large set of example inputs must be collated, but no labeling or other human intervention is needed. Instead, simply by acting on the training set, and applying to it learning rules, an ANN using unsupervised learning may discover relevant and useful statistical structure in the training set. However, the performance of ANNs using unsupervised learning lags far behind those that use supervised learning.

Other neural networks include those known as hierarchical temporal memory, or more simply, "HTM". HTM based learning is based on the physiology of interaction among neurons in the neocortex in mammals, and may allow the learning of time-based patterns in unsupervised learning scenarios. For example, in US Pat. Pub. No. 2007/0192267 to Hawkins et al., temporal sequences are recognized among "coincidences". Coincidences are combinations of inputs that are active at the same time with a rate statistically greater than would be expected by chance. However, individual coincidences will occur at very low probability in a high-dimensional input stream. For instance, if there are 100 binary variables in the input at each time step, then there are a total of $2^{100} \sim 10^{30}$ possible patterns of binary activity encoded in the input. Consequently, most of these patterns will never occur in the entire lifetime of the operation of the learning algorithm. Furthermore, variability in the input stream (e.g., "noise" in measurement devices, such as video cameras, microphones, etc.) will cause the same underlying coincidence in the input stream to be encoded in variable patterns of binary activity.

As a result, cataloging each of these coincidences may be inefficient and disorganized, making it more difficult to take the next step of recognizing temporal sequences of such coincidences which occur at an extremely low rate, or because different and potentially overlapping sets of apparent coincidences may be associated with the same underlying coincidence.

Therefore, a need exists for a system and methods by which objects and patterns of behavior or movement can be determined quickly and efficiently. The present invention satisfies the demand.

SUMMARY OF THE INVENTION

The present invention is directed to a system and methods by which a plurality of computations may be conducted simultaneously to expedite the efficient determination of pattern recognition. Certain specific embodiments of the present invention may be used for a variety of applications including but not limited to "machine vision"—not only for face recognition, but also the identification of patterns of movement—segmentation and the identification of objects that, for example, may be stereotyped, such as tools, cars, kinds of trees, kinds of pets, etc., temporal prediction—such as weather forecasting or stock price prediction identification of customers and their patterns of behavior including the purchasing patterns of customers, grouping of customers according to their behavior, or other determined characteristics.

Certain embodiments of a system and methods of the present invention generally include one or more modules connected in a hierarchical arrangement, where information is passed between modules, and within a module itself to detect and predict certain patterns of interest. A module may include one or more layers of nodes, each layer of nodes also arranged in a hierarchical fashion. A first layer of nodes within a module may be configured to receive an input stream of information in the format of a population code. This population code can be produced by a set of filter functions acting on data from a set of one or more sensor devices that encode this data in a redundant, overlapping binary code, or it can be produced by another module in the hierarchy. The population code may include one or more clusters comprised of a set of many population activity patterns. A learning rule (e.g. Hebbian and winner-take-all) may be applied to the clusters such that each node in the first layer is activated, or has a preference, for only one of the clusters. Once a node in the first layer is activated, information may be passed to a second layer of neurons within a module, where the information of the sensory event is further evaluated to identify temporal sequences in the information. Further, nodes in the second layer may be interconnected to one another via recurrent synapses, which are activated according to spike-timing dependent plasticity to produce temporal sequences. The temporal sequences may be communicated to a third layer of nodes to prepare sequence predictions, which may be fed back to the first layer to enhance the activity of correct predictions, which may also be fed back to a second layer in a module in a lower position in the hierarchy. The temporal sequences may also be communicated from the second layer and used as input to a first layer of the next module higher up in the hierarchy.

There are many advantages associated with the embodiments of the present invention. For example, relative to existing deep networks, embodiments of the present invention can learn temporal structure from the information that is received as inputs without any supervision (although certain embodiments can be augmented with supervised learning, where labeled data sets exist). Also, the present invention may be scaled more naturally such that more hierarchical levels may be added without detailed fine-tuning of the interactions between levels. Certain embodiments of the present invention may also be used also to identify hierarchical temporal correlations in data—not only strong temporal correlations identifiable on a short time scale, but also weaker and weaker correlations on longer and longer time scales that can be approximated as correlations among lower-level temporal sequences.

An additional benefit of the present invention is that certain embodiments of the system may be configured and used to demonstrate the operation of natural systems such as the operation of the mammalian neocortex and the layers of neurons.

Moreover, and as mentioned, current ANN systems suffer from inefficient and disorganized cataloging of certain coincidences, making it difficult to recognize temporal sequences of such coincidences. The present invention overcomes these problems by processing the input to each level with a step that maps sets of input patterns onto the same "cluster" (e.g. occurring, for example, in a first layer). Thus, the input to the temporal sequence learning stage (e.g. a second layer) is the activity of nodes (e.g. fist layer nodes) that individually represent the occurrence of clusters in their input (i.e., possess cluster tuning).

A cluster consists of a set of many binary activity patterns. Therefore, even though each individual binary activity pattern might occur at an extremely low probability, the cluster itself may occur far more often. This enhanced sampling frequency is crucial for learning valid temporal correlations at the next stage (e.g. second layer). Furthermore, different noise-corrupted versions of the same underlying coincidence may be mapped to the same cluster. As a result, clusters exhibit a form of error correction. This error correction is crucial, as it may properly organize the input stream and thus enhance temporal sequence learning at the next stage.

The present invention also improves upon the field of invention by organizing the input stream into a population code in the low temperature limit. This is accomplished by employing sufficiently many filter functions with sufficient overlap of their tuning as well as by converting their strength into a binary activation at each time step. As a result, the correlation among binary activation streams among filter functions may be sufficient to put the population code in the low temperature limit. The low temperature limit is advantageous, because it implies that the population code is always organized into clusters. In fact, clusters are present, even if the input stream itself is uncorrelated.

The present invention also improves upon the field of invention by employing sufficiently many nodes (e.g. in the second layer) along with sufficient density of feedforward connections from a lower level to a higher level (e.g. a first layer to a second layer), such that the output of a layer, for example, the second layer, may also be a population code in the low temperature limit. Therefore, layer one nodes may always be able to develop cluster tuning at every stage of the hierarchy. As used herein, the term cluster tuning refers to the property that the activity of a node is approximately a function of the cluster index of its input, and not of the specific binary activity pattern of its input. In other words, this means that the activity of the node will be approximately the same for all binary input patterns within the same cluster.

The present invention also improves upon the field of invention by preventing a combinatorial explosion of the number of possible temporal sequences at higher stages of the hierarchy by learning clusters in the population code and then learning temporal sequences only among those clusters. Specifically, at a given level of the hierarchy, a higher-level layer (e.g. a second layer) may learn a large set of temporal sequences. But because the second layer output is formatted as a population code in the low temperature limit, these many learned sequences will be organized into a discrete set of many fewer clusters of sequences. Because these output clusters serve as fundamental "events" for the next stage of the hierarchy, a combinatorial explosion is prevented. The previous invention prevents a combinatorial explosion of possible sequences by truncating the list of inputs to the sequence learner to a subset of all possible inputs. The present invention improves on the previous invention by organizing all inputs into a smaller number of clusters, such that all inputs are still used to drive sequence learning.

The present invention also improves on the field of invention by converting learned temporal sequences into predictions about what will be the next element arriving at the input to the module and feeding these predictions forward into the input layer (such as an operation that occurs within, for example, a third layer within each module). This may bias the cluster tuning in, for example, the first layer, towards clusters that can be correctly predicted by temporal sequences learned in the second layer. This bias may allow the present invention to learn temporal sequences more efficiently as well as allow the present invention to learn valid causes in an input stream more accurately.

The present invention also improves upon the field of invention by not directly computing the probability of occurrence of individual temporal sequences. In general, such calculations may be highly inaccurate, because they do not include all sources of temporal correlation and because the constituent probabilities are subject to inaccuracy due to sampling.

Additionally, certain embodiments of the system may be advantageously configured and used to demonstrate the operation of natural systems such as the operation of the mammalian neocortex and the layers of neurons. What is termed a "node" in the present invention may correspond with an individual pyramidal (excitatory) neuron. A "layer" may correspond to one of the major layers of neurons identified by anatomists, with some differences. A "module" may correspond to a cortical column. Adjacent modules may encode for partially overlapping spatial regions. A spatially organized set of local modules may correspond to a cortical brain region (e.g. primary visual cortex, V1, versus secondary visual cortex, V2).

DETAILED DESCRIPTION OF THE INVENTION

The present invention is directed to a system and methods by which pattern recognition may be facilitated. More specifically, the present invention is a system and methods by which a plurality of computations may be conducted simultaneously to expedite the efficient determination of pattern recognition.

Artificial neural networks may, in some aspects, generally comprise a computational model configured to resemble naturally occurring, biological neurons.

An artificial neuron may receive, for example, signals through specialized inputs known as synapses. If a received signal is strong enough to overcome a certain threshold value, the neuron may be activated and emit a signal, or output. This signal might also be sent to another synapse, and may activate other neurons. The signals transmitted between neurons are encoded in sequences of stereotypical short electrical impulses, called action potentials, pulses, or spikes.

Each connection between neurons may have a weight associated with it that represents the strength of the sending neuron's signal. In some artificial systems, the weight can change based on a pattern of activity of signals over the connection, or signals over other connections. This change can be persistent, or revert to the nominal response over time. An activation function may be associated with the receiving neuron, which may multiply and sum the weights of the signals received from other neurons, and may calculate whether the neuron will fire. Upon firing, the neuron sends signals that may either activate or inhibit other connected neurons, or cause the network to output an external response. In more complex systems, a neuron output may include an analog value or time-variant function. The connection weights between neurons may be adjusted, based on, for example, the neural network's production of successful outputs. These connection weights may comprise the neural network's knowledge or learning.

Figure 1:
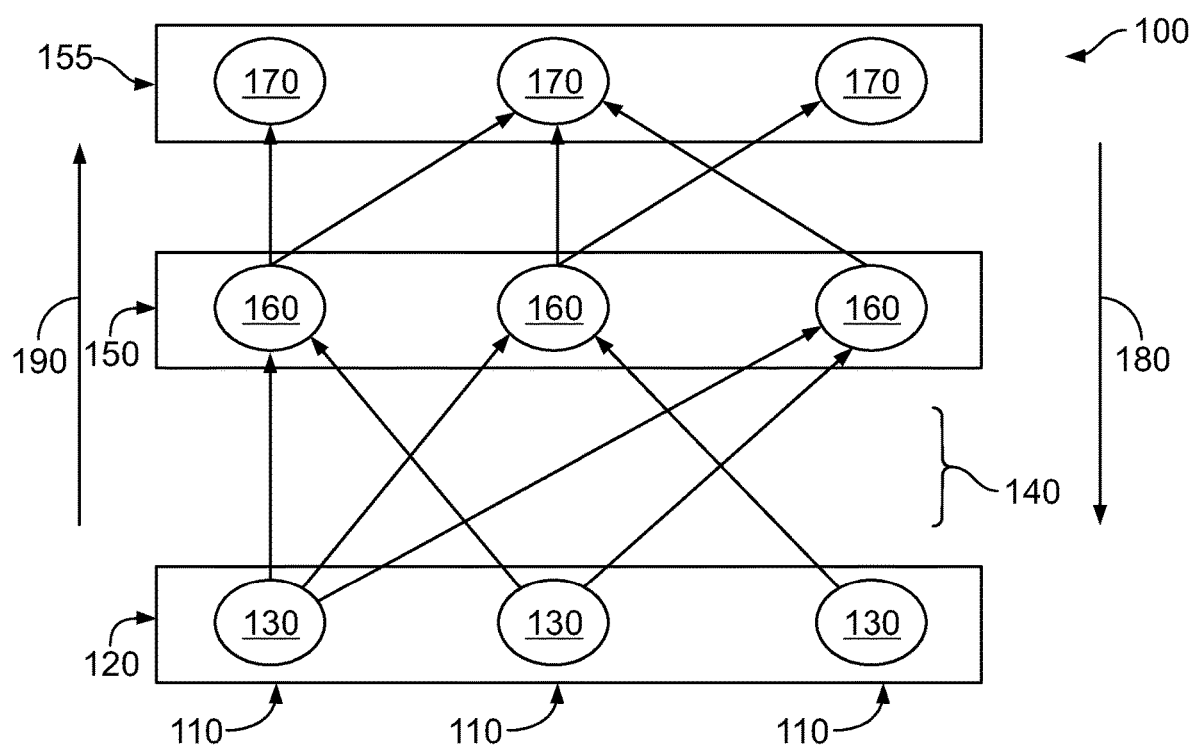
FIG. 1 illustrates a simple artificial neural network.

FIG. 1 generally illustrates an embodiment of an artificial neural network of the present invention, including a plurality of spatially organized sets of local modules 100. The modules 100 may be connected hierarchically. For convenience of description, the terms "above", "below", "upper", "lower", "horizontal", "vertical", "ascending", and "descending" will be used to refer to the system, the separate spaced state at which certain components of the system are placed (the "hierarchy" of the system), and the operation of these components relative to one another. One orientation of the hierarchy of such states is illustrated in the accompanying drawings. The illustrated orientation will be used to describe certain components of the present invention and the separate spaced state at which each may operate. However, it will be understood that the embodiments of the invention described in this application advantageously can be used in a variety of orientations.

Embodiments of a system may be configured to accept input from a lower level in the hierarchy and organize it into a new feature map based on clustering of population-level activity patterns. The system may be configured to permit the input received through an ascending pathway and determine (or "learn") temporal correlations among the features. The system may be configured to also receive as input through a descending pathway the temporal sequences learned at a higher-level input and determine and generate predictions about what feature event may occur next. These predictions may be used to verify the utility of the existing feature map in each module, as well as to anticipate the future.

In certain embodiments of the present invention, the local modules 100 (for sake of simplicity, only one module is shown, but a system may comprise any number of interconnected modules) may comprise multiple layers of nodes 120, 150 and 155. The nodes 130, 160 and 170 may be arranged in a spatially organized array. Each module may have an upward flow of information 190—by which information (or one or more "signals") may be distributed "up" the hierarchy—and a downward flow of information 180 by which information (or one or more "signals") may be distributed "down" the hierarchy. Each hierarchical layer may be configured to permit qualitatively distinct computations to be performed in multiple layers 120, 150 and 155 of spatially organized nodes 130, 160 and 170. Nodes from one layer may be connected to one or more nodes located in a different layer through synaptic connection 140 that allow the exchange of information between nodes, and therefore between layers of nodes. For example, FIG. 1 illustrates nodes 130 of node layer 120 connected to node 160 of node layer 150. Information arriving from another level in the hierarchy may be termed "input" 110 for purposes of this application. Information that may be transmitted to another level in the hierarchy, or module, may also be referred to as "output".

Figure 2A:
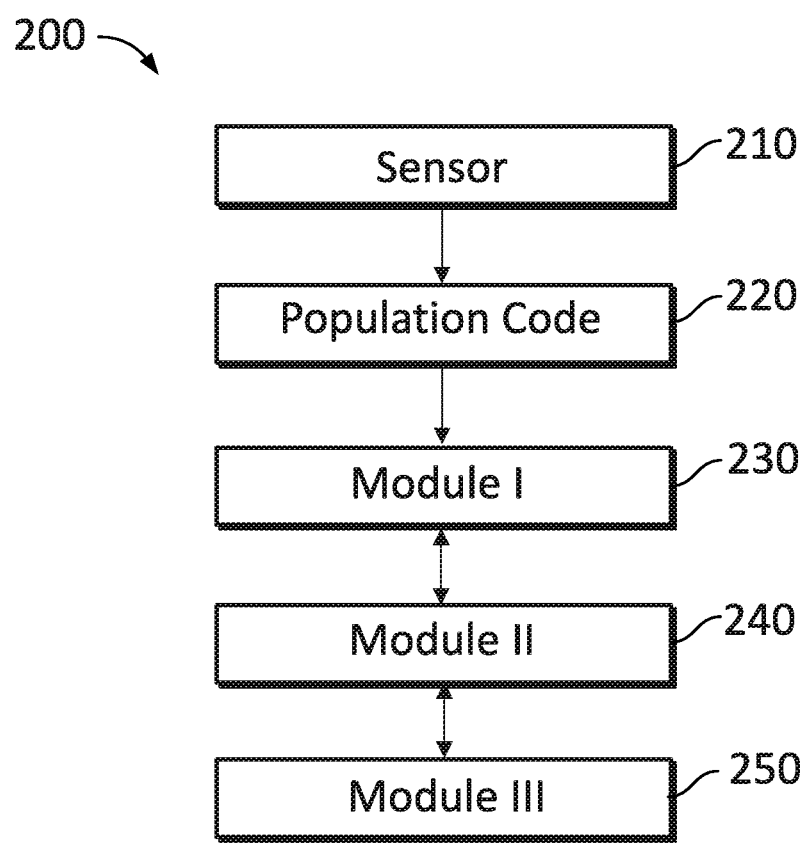
FIG. 2A illustrates a flow diagram showing the general operation of one embodiment of an artificial neural network.

FIG. 2A illustrates the initial flow of information within an embodiment of a system 200 of the invention. The system 200 includes receiving information of interest, such as a sensory event, through a sensor 210, where the information is used in the form of an input stream.

An input stream may include one or more sets of time series. Furthermore, the elements of the time series must contain correlations across time that the present invention is able to learn and use to make predictions. However, inputs that do not have these properties, such as still photographs, may be converted into a time series for use with the present invention by translating the image using statistics that mimic human eye movements.

Generally, information or signals may be collected in various forms which may include, for example, sensory input of one or more modes such as visual and/or touch, sound, electromagnetic waves (e.g., in visible, infrared, and/or radio-frequency portion of the EM spectrum), input provided by an appropriate interface (e.g., a lens and/or antenna), video clips including natural visual scenes and motion in the scene, video clips of natural visual scenes filmed with camera motion, video clips of human-made movies—including both produced movies (Hollywood) and home movies (YouTube, Facebook, etc.)—natural auditory scenes, complex natural processes—including, for example, wind, waves, weather—human generated behaviors and decisions—including human speech, human movement, sports events, product sales across time, answers to internet polls, and more.

The input stream may be used to produce a population code 220. The population code 220 may be transferred into a first module 230 where the population code undergoes temporal pattern recognition and learning, and this signal may be communicated to a higher level within a given module. The signal may then be communicated to a higher module 240 in the hierarchical system where the signal may undergo a similar process as in the first module. The resultant signal may then be communicated to another module in the hierarchy 250, where a similar analysis takes place. The signals from the various modules may be communicated to a higher or lower module to increase the efficacy of each module.

Figure 2B:
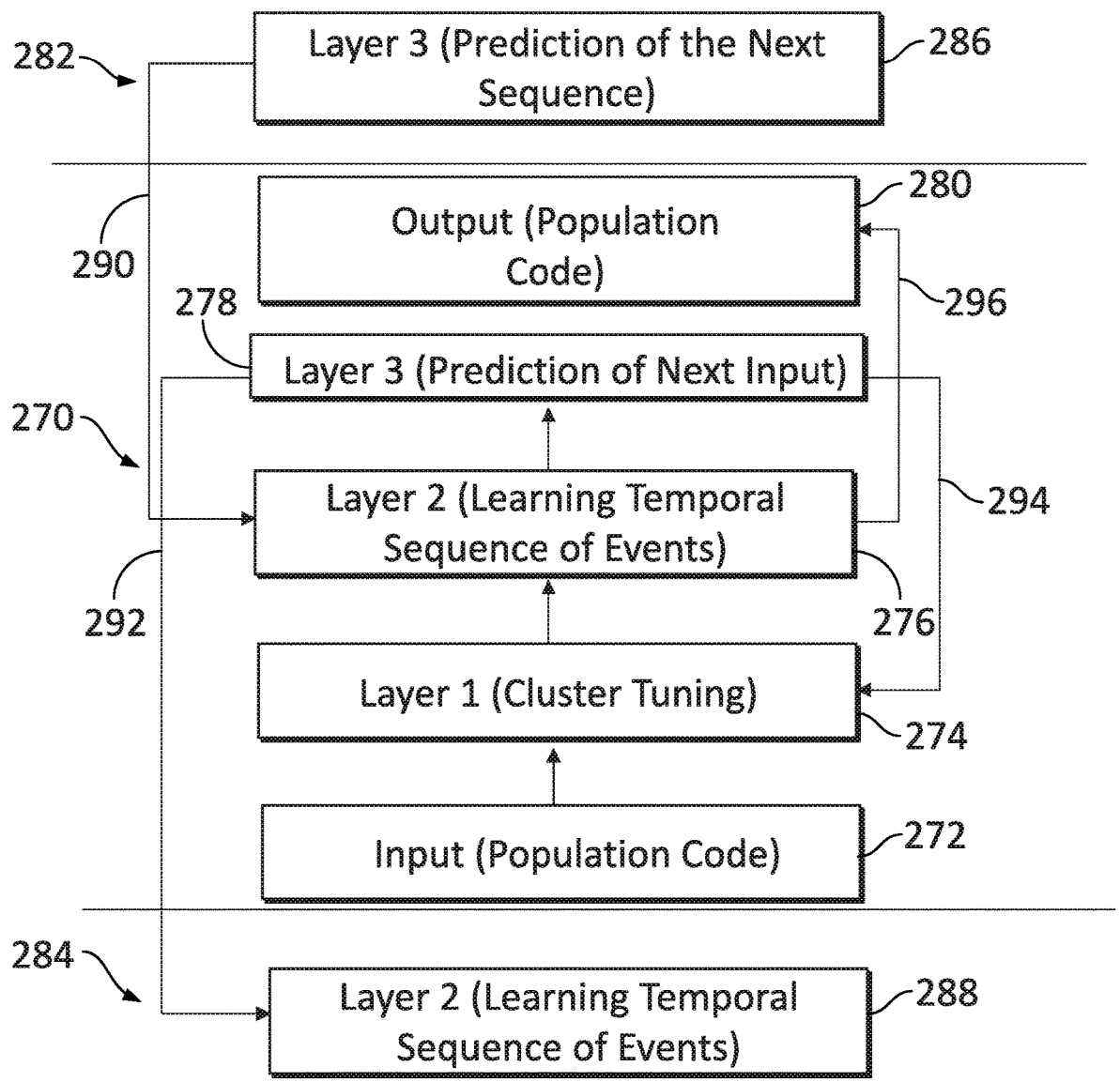
FIG. 2B illustrates a flow diagram showing the operation within a module of one embodiment of an artificial neural network.

FIG. 2B illustrates an overview of the information flow within an exemplary module. An individual module 270 may include a plurality of layers of nodes arranged in hierarchical positions, such as, for example, a layer 1 identified by 274, a layer 2 identified by 276 and a layer 3 identified by 278. However, a module may have more or less layers as needed. An input 272 may enter a module 270 as an input stream from, for example, a sensor, or from a different layer of nodes in a module lower in the hierarchy, as shown in FIG. 2A. In instances where the input is from a sensor, the input is passed through certain filters to produce the population code 272. Once the input, in the form of a population code enters into layer 1, shown by 274, the feedforward weights into layer 1 undergo learning such that nodes in layer 1 develop cluster tuning. By way of a simple example, cluster tuning may involve the following: a large set of images containing one kind of pet, e.g. some images are of dogs, others a cat, and still others, a parrot. Each image may be converted into a population code via many filter functions. Each image may then be represented as a binary vector. The population code, in this example, may have 3 clusters: one each for dogs, cats, and parrots. Each image may give rise to a specifically different binary vector. Each binary vector would activate to a single cluster (dog, cat, or parrot). Each cluster would consist of a set of many binary vectors (e.g., multiple images of different dogs).

After cluster tuning, the information may be transmitted through feedforward synapses to layer 2, indicated as 276, where the nodes in layer 2, in part through recurrent synapses using spike-time dependent plasticity "learn" the temporal sequence of events in their input (i.e. nodes in layer 1 that represent clusters).

The information from layer 2 shown by 276 in FIG. 2B may then be transmitted through feedforward synapses to a level 3, shown as 278, which may predict the next input. Layer 2 may produce and transmit 296 an output, in the form of a population code 280, that may be transmitted to another module 282 (e.g. into a layer 1), where the process may be repeated. Further, the output 280 may be communicated through one or more layers (not shown) in module 282 to layer 3, identified as 286, and may then may be fed back 290 into layer 2 shown as 276 of module 270 to increase the efficacy of temporal learning. Similarly, the information from layer 3 shown as 278 of module 270 may be fed back 292 into a layer 2 shown by 288 of module 284 (other layers not shown). Moreover, information of layer 3 of module 270 (the prediction of sequences) may be fed back 294 into layer 1 of module 270 to improve cluster tuning.

Figure 3:
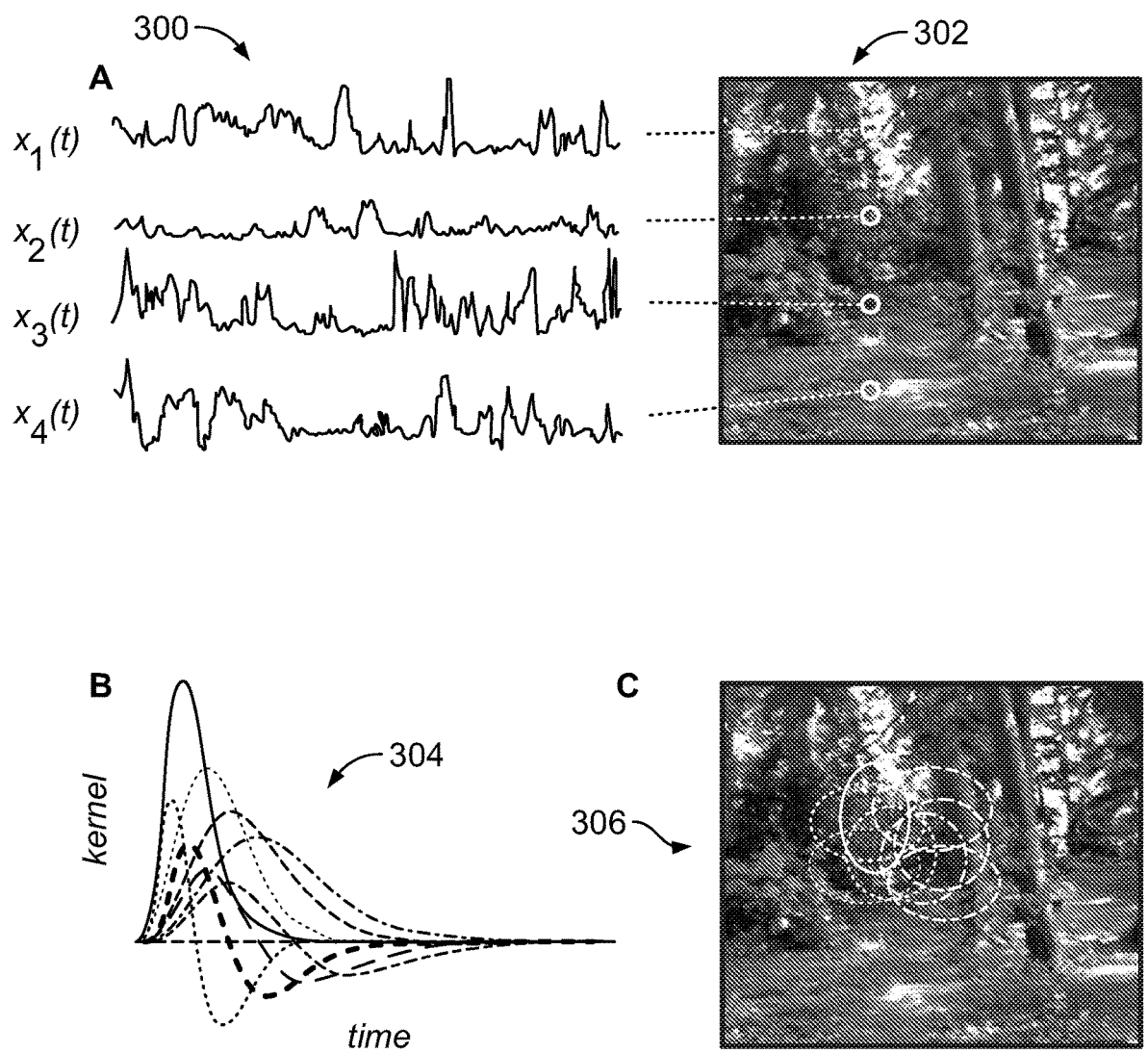
FIG. 3 illustrates transducing the Input into a population code A. Example of an input to the algorithm that consists of a video clip. In each pixel i, the light intensity varies in time, $x_i(t)$. The input stream may be processed by a set of kernels, $k_{ij}(t)$, that use convolution in time (B) and integration across pixels (C). B. Convolution functions consist of a variety of smooth functions possessing combinations of temporal integration and differentiation. C. Pixel weights consist of a variety of regions with different locations and sizes.

The following is a more specific description of certain embodiments of the invention. As illustrated in FIG. 3, Panel A, the input 300 may generally be described as a set of time series, $\{x_i(t)\}$. In one certain embodiment of the invention, the input may be a video stream, where the index i denotes a pixel in each frame 302, and $x_i(t)$ is the light intensity versus time. The input may also be an auditory environment, where $x_i(t)$ defines the sound pressure measured on microphone(s) i. Furthermore, the sound pressure measured on each microphone may be converted into a spectrogram, $\{x_i(t)\} \rightarrow \{S_i(\omega, t)\}$, where $S_i(\omega, t)$ is the power spectrum computed in a window around time t using a wavelet transformation. The, input stream and time series, $x_i(t)$ may also be the sales of product i as a function of time. In yet another embodiment, $x_i(t)$ is a series of characters of text from document i. In all cases, it is essential that the input 300 include a set of time series. In full generality, each time series may be denoted with i, in the input stream as an "element". As for the example of an auditory environment, each time series may be pre-processed into a more useful form. For simplicity, the pre-processed time series may still be denoted as $\{x_i(t)\}$.

The input stream may be converted into a "neural" representation that an embodiment of the system of the invention may process, by computing a set of filtering functions of the input, $\{y_i(t)\}$. Each filter function, $y_j(t)$, has a kernel, $k_{ij}(t)$, that acts on each element with linear convolution in time (304 of FIG. 3, panel B) followed by a non-linear transfer function:

$$y_j(t) = F_j\left[\sum_i^{pixels} \sum_{t'}^{time} x_i(t')k_{ij}(t-t')\right] \text{ where } F_j[x] = \frac{\alpha_j}{1+\exp(-\beta_j(x-\theta_j))}.$$

Each filter function j is defined by a unique set of parameters, $\{\alpha_j, \beta_j, \theta_j, k_{ij}(t)\}$, where the parameter $\alpha_j$ is the amplitude of non-linear transform, $F_j$, $\beta_j$ is its slope, and $\theta_j$ is its threshold. In some embodiments, the kernel will have the same temporal profile for each input element, $k_{ij}(t)=w_i k_j(t)$, where $w_i$ is the weight given to each element. The set of filter functions will have parameters that are heterogeneous and overlapping (Segev, Puchalla et al. 2006), such that the set of filter functions will together encode the input stream redundantly (Segev, R., J. Puchalla and M. J. Berry, 2nd (2006). "Functional organization of ganglion cells in the salamander retina." J Neurophysiol 95(4): 2277-2292; Puchalla, J. L., E. Schneidman, R. A. Harris and M. J. Berry (2005). "Redundancy in the population code of the retina." Neuron 46(3): 493-504.). In one embodiment (see FIG. 3, Panel B), the temporal profile of the kernels, $k_j(t)$, will include some functions that integrate the input across time (monophasic) along with other temporal profiles that compute time derivatives of the input (biphasic or triphasic) (Segev, R., J. Puchalla and M. J. Berry, 2nd (2006)). Temporal profiles will include a spectrum of time delays. In one embodiment, the weights across elements will be compact and overlapping 306 (FIG. 3, PANEL C). In another embodiment, the weights will be chosen randomly without the requirement to be compact. In one embodiment, the kernels will be designed to match specific characteristics of the application, while in other embodiments, the kernels will be chosen randomly.

In all embodiments, the filter functions, $y_j(t)$, will be converted into a binary sequence, $r_j^{in}(t)$, using the stochastic rule, $P[r_j^{in}=1]=y_j$ and $P[r_j^{in}=0]=1-y_j$. This conversion is part of the process of translating the input stream into neural representation. This set of binary sequences may be referred to as the "population code". The population code will have sufficient correlation and/or redundancy among their activities, $r_j^{in}(t)$, to put the population in a low temperature limit. As used herein, a low temperature limit refers to the population code having a peak in its heat capacity above T=1. (Ioffe, M. L. and M. J. Berry II (2016). "The Structured 'Low Temperature' Phase of the Retinal Population Code." arXiv 1608.05751v1.) If the Pearson correlation coefficient between the activity j and j' is $c_{j,j'}$ and the number of filter functions is $N_{input}$, then in one embodiment the root-mean-squared pairwise correlation will exceed the limit: $N_{input} \langle c_{j,j'}^2 \rangle_{pairs}^{1/2} \geq 1$.

Figure 4A:
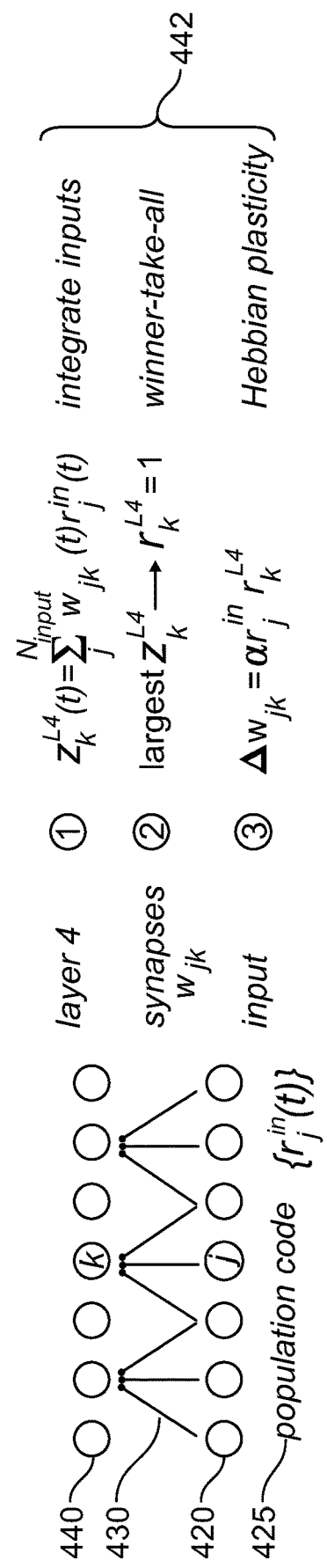
FIG. 4A illustrates computation in layer 4 (L4). The input stream is in the form of a population code at each time step, $\{r_j^{in}(t)\}$. These activities feed into L4 nodes with weights, $w_{jk}(t)$. Weights are adjusted according to a competitive Hebbian plasticity rule.

As illustrated in FIG. 4A, input 420 may preferably be in the form of a population code 425 in the low temperature limit. This limit of sufficiently strong correlation between nodes in the population code will guarantee that activity in the entire population is automatically organized into a discrete set of clusters. Specifically, the population code will contain a set of clusters, $\{C_\alpha\}$, where $\alpha \in [1, m]$. Each cluster may include a (typically large) set of activity patterns in the population that map onto that cluster. As used herein, an activity pattern is a set of binary activities over all $N_{input}$ filter functions. This is a binary vector with $N_{input}$ components. Every population activity pattern, denoted $\{r_j^{in}\}$, will map onto one and only one cluster, $C_\alpha$.

In one embodiment of this invention, the input weights 430 that map this population code into layer 4 (L4) 440 will be adjusted via a learning rule such that individual nodes in layer 4 440 are activated by any of the input patterns within a single cluster. Specifically, this means that the response of a L4 node to inputs, which in general depends on both the weights and the population activity pattern, will be approximately a function of only the cluster index: $r_k^{L4}(t) \approx f[\alpha(t)]$. We refer to this property as "cluster tuning". Each L4 node will have a preferred cluster, which is the cluster, $\alpha_k^{pref}$, that produces the maximum activity, $r_k^{L4}$. Different nodes within layer 4 will learn to be activated by a different preferred cluster, such that all clusters in the input population will have at least one L4 node that prefers that cluster.

In one certain embodiment of the invention, this learning rule may be competitive Hebbian clustering 442 (Rumelhart, D. E. and D. Zipser (1985). "Feature Discovery by Competitive Learning." Cognitive Science 9: 75-112). Specifically, if the weight between input node j and L4 node k is $w_{jk}$, then the total input strength into a L4 node is:

$$z_k^{L4}(t) = \sum_j^{N_{input}} w_{jk}(t) r_j^{in}(t).$$

This variable can be thought of as the sub-threshold depolarization of a neuron. These strengths may be rank ordered into a list of decreasing amplitudes, $\{Z_k^{L4}\}$, such that $Z_{k'}^{L4} \geq Z_{k'+1}^{L4}$. Then, a set of the nodes with the highest input strength, $\theta$, may have activity $r_{k' \leq \theta}^{L4}(t)=1$ and the rest may have activity $r_{k' > \theta}^{L4}(t)=0$. After activities are assigned in L4 nodes, the input weights may be updated according to a Hebbian plasticity rule: $\Delta w_{jk} = \alpha r_j^{in} r_k^{L4}$, where $\alpha$ is a learning rate to be adjusted for best performance. In other situations, the activity of the L4 nodes will be a sigmoidal function of their input strength:

$$\rho_k^{L4} = F_k(z_k^{L4} - \Theta^{L4}),$$

where $\rho_k^{L4}$ may be thought of as a firing rate and $\Theta^{L4}$ may be a source of global inhibition that implements competition among nodes (Kappel, D., B. Nessler and W. Maass (2014). "STDP installs in Winner-Take-All circuits an online approximation to hidden Markov model learning." PLoS Comput Biol 10(3): e1003511.):

$$\Theta^{L4} = G(\{z_k^{L4}\})$$

such that $$\sum_k^{L4 \, nodes} \rho_k^{L4} = const.$$

As a result, competition is softer than a winner-take-all policy, leading to tuning curves of L4 nodes that may be less sharply peaked on a single cluster in the input population. Perfectly sharp cluster tuning refers to the property that $\rho_k^{L4}=1$ for $\alpha=\alpha_k^{pref}$ and $\rho_k^{L4}=0$ for all other clusters present in the input population. Less sharply peaked cluster tuning refers to the property that $\rho_k^{L4}>0$ for $\alpha \neq \alpha_k^{pref}$ with the sharpness being inversely proportional to the distance the activities are away from zero. In such embodiments, each firing rate may be converted to a binary activity in each time step $r_k^{L4}=1$ with probability $\rho_k^{L4}$ to form a population code $\{r_k^{L4}\}$ that may serves as the output of layer 4.

Figure 4B:
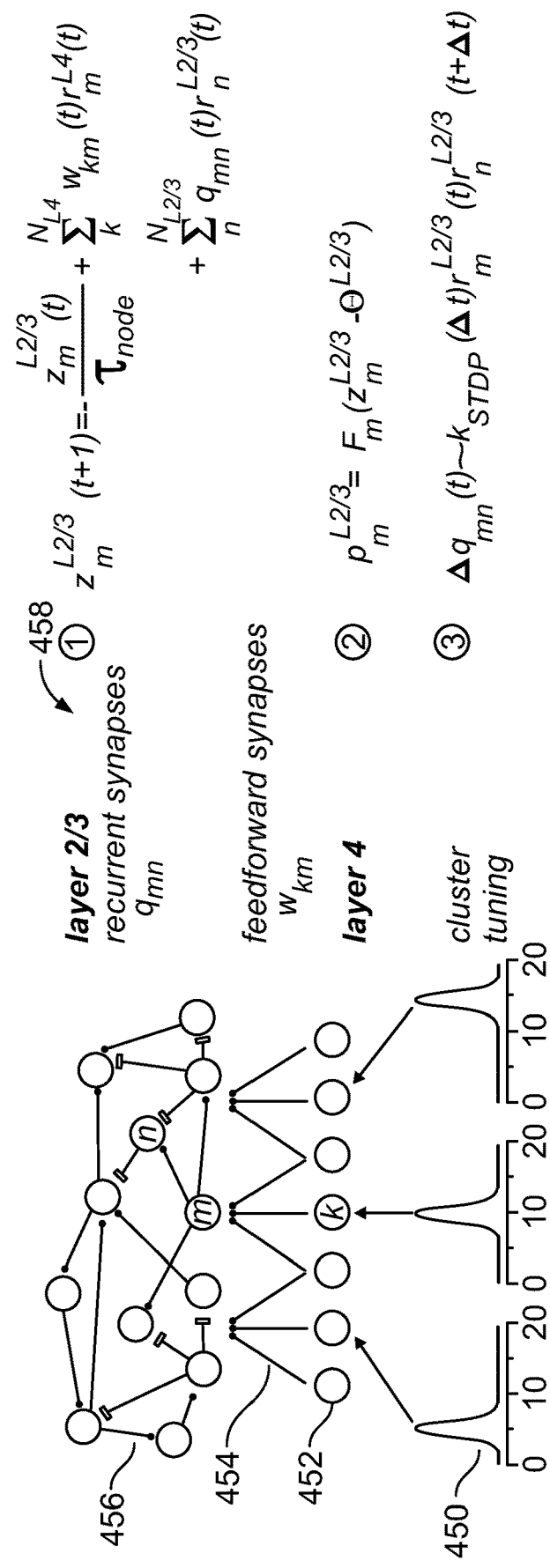
FIG. 4B illustrates computation in layer 2/3 (L2/3). The population code of layer 4 serves as the input to layer 2/3, which drives L2/3 nodes through feedforward weights, $w_{km}$. In addition, there are recurrent weights between nodes in L2/3, $q_{mn}(t)$. Recurrent weights are adjusted according to a causal Hebbian plasticity rule.

In one certain embodiments of the invention illustrated in FIG. 4B, nodes in layer 2/3 indicated by 456 may receive input from both feedforward synapses $w_{km}$ 454 from layer 4 shown as 452, and recurrent synapses within layer 2/3, $q_{mn}$ 458. In addition, L2/3 nodes 456 integrate those inputs with a time constant, $\tau_{node}$. The variable $z_m^{L2/3}$ can be thought of as the sub-threshold depolarization of neuron m in layer 2/3. This variable is then converted into a firing rate, $\rho_m^{L2/3}$, through a sigmoidal non-linearity, as in layer 4. As in layer 4, the firing rate is converted into a binary activity variable, $r_m^{L2/3}$, which serves the population code output of layer 2/3 as well as which feeds into the synaptic learning rule. Cluster tuning 450 of L4 nodes may occur due to learning rules in the feedforward weights, $w_{jk}$, described above. Cluster tuning is a property of L4 nodes that emerges after a learning process. The population code is automatically organized into clusters. But as shown here, nodes in the population code do not yet possess cluster tuning.

Figure 4C:
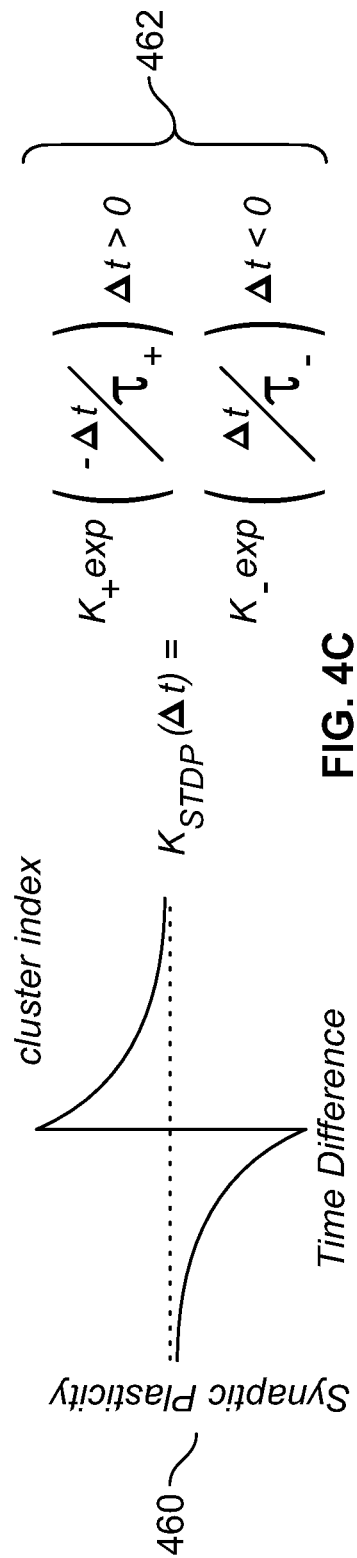
FIG. 4C. illustrates spike-timing dependent plasticity. If non-zero activity of the input node precedes non-zero activity of the output node in time, the weight between the nodes is increased in strengthened with an amplitude that decays at longer time intervals. If the opposite is true, the weight weakens.

As illustrated in FIGS. 4B and 4C, the recurrent synapses 458 may follow a causal learning rule known as spike-timing dependent plasticity 460, 462. This learning rule adjusts the recurrent weight for each pair of non-zero activities, such that the weight increases if a non-zero activity of node m preceded a non-zero activity of node n, and weakens the weight if vice versa. Due to this learning rule, the recurrent synapses may become selective for repeated sequences of L4 events. For instance, if the sequence ABC is repeated multiple times, then the L2/3 nodes responding to event A will develop strong synapse connections with other L2/3 nodes responding to event B, and so on.

In one embodiment, the recurrent synapses may have sufficient heterogeneity to put the layer 2/3 network into an echo state (Buonomano and Maass 2009). This tuning of synaptic weights may be achieved through a combination of slow, homeostatic anti-Hebbian synaptic plasticity (Stepp, N., D. Plenz and N. Srinivasa (2015). "Synaptic plasticity enables adaptive self-tuning critical networks." PLoS Comput Biol 11(1): e1004043.) as well as by adjustments of the global inhibition, $\Theta^{L2/3}$. In an echo state, information arriving from layer 4 not only excites a sparse set of L2/3 nodes in the same time step, t, but also excites "echoes" of this information in subsequent time steps. These echoes may include different populations of L2/3 nodes in each subsequent time step, t+Δt. Thus, these echoes constitute a short-term memory of the original event that occurred at time, t (Nikolic, D., S. Hausler, W. Singer and W. Maass (2009). "Distributed fading memory for stimulus properties in the primary visual cortex." PLoS Biol 7(12): e1000260.). Because the layer 2/3 network maintains echoes of past input events, it may learn temporal correlations at longer time intervals compared to a situation devoid of echoes. Therefore, the echo state enhances the ability of the network to learn a broad set of temporal correlations in the input, especially if those correlations are not found in consecutive time steps.

In another certain embodiment of the invention, the threshold for each node to become active, $\theta_m$, will be set to be sufficiently high that activity in the L2/3 network will be sparse. If this activity is sufficiently sparse, then a L2/3 node will only be active once while an entire temporal sequence is ongoing in the input. As a result, the L2/3 node will have a pointer-like representation of the occurrence of the temporal sequence. In addition, the global inhibition, $\Theta^{L2/3}$, will help maintain sufficiently sparse activity. In addition, the feedforward synapses from L4 nodes onto L2/3 nodes will obey a Hebbian plasticity rule. This plasticity will strengthen the feedforward pathway from L4 nodes onto specific L2/3 nodes, further sparsifying L2/3 activity.

In one certain embodiment of the invention, the layer 2/3 network may have enough nodes such that the population code may also exist in a low temperature state.

Figure 5:
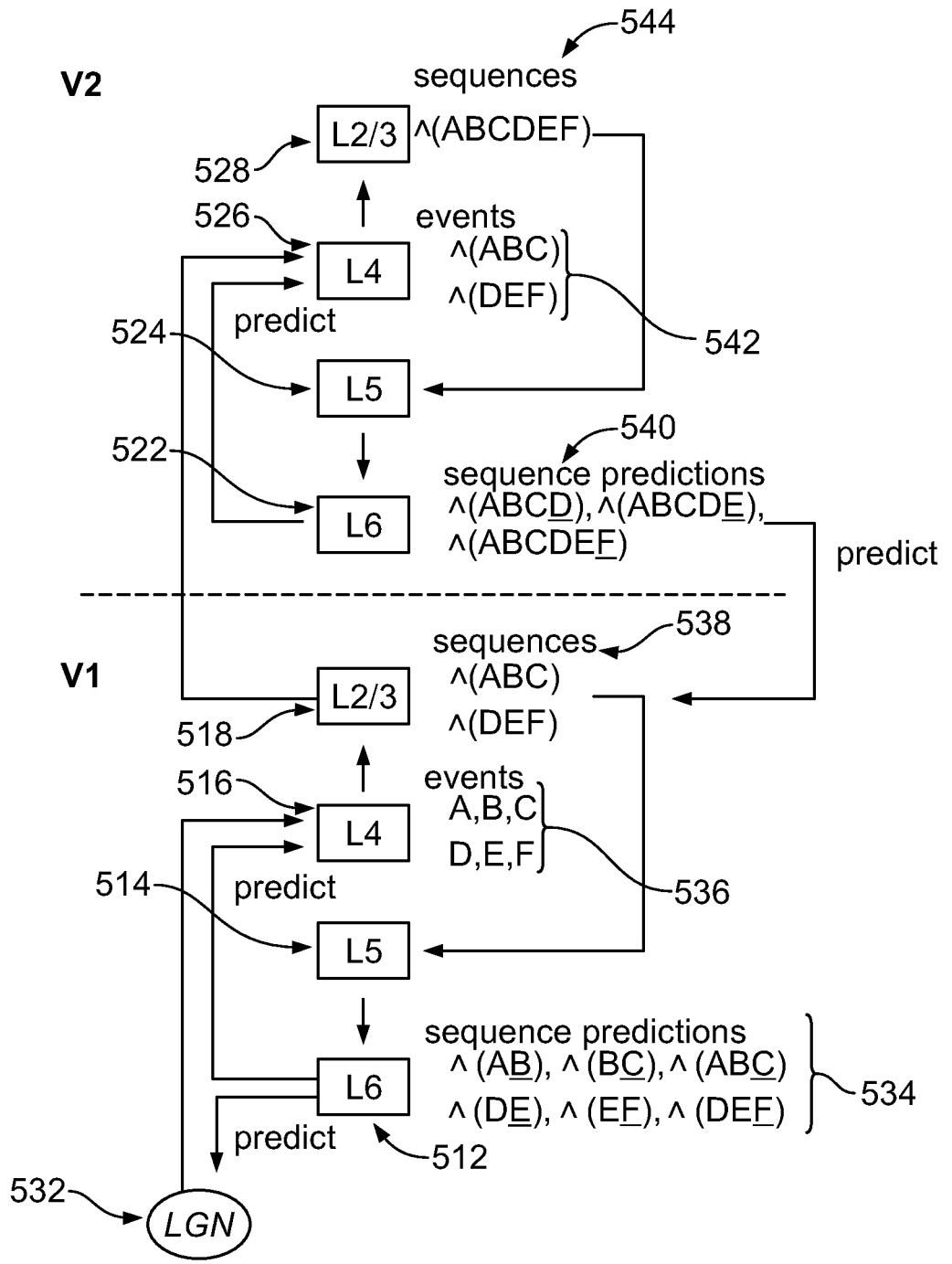
FIG. 5 illustrates a flow diagram showing the operation of an additional embodiment of the present invention.

FIG. 5 illustrates the operation of one embodiment of the present invention. Information obtained by one or more sensors 532—collectively "sensory events"—may be received and entered into a layer of the first hierarchal level or module of the system—identified as layer 4, or "L4" as indicated by 516 of the first level or module "V1" of the illustrated embodiment. The input from sensor 532 may be designated as A, B, C, D, E, and F 536. Sensory events processed in layer 4, shown as 516, may be communicated to another layer layer 2/3 or "L2/3" shown as 518. Layer 2/3, shown in FIG. 5 as 518, may be configured to recognize and group, among the sensory events encoded by layer 4, indicated by 516, the temporal correlations into sequences, such as ABC and DEF 538. These sequences may be represented by pointers, denoted, for example, by ˆ(ABC) 538, which may be a single period of activity during the entire sequence.

Further, the system may communicate the sensory events from layer 2/3 shown as 518 "up" the hierarchy. For example, the sensory events may be communicated into layer 4, shown as 526, of the hierarchical module of V2—or "L4 of V2". In response to the input of these events at L4 of V2, indicated by 526, an embodiment may be configured to activate single nodes representing the entire temporal sequence. More specifically, the feedforward synapses onto layer 4 may use competitive Hebbian plasticity to map clusters of layer 2/3 activity onto the activation of single nodes in layer 4. As the clusters of activity in lower layer 2/3, shown as 518, represent an ongoing temporal sequence, shown as 538, this mapping may result in single nodes in a higher layer 4, shown as 526, that represent that same temporal sequence 542.

The input received at L4 of V2 shown by 526 may then be communicated to layer 2/3 of V2 or "L2/3 of V2" shown as 528 in FIG. 5 which may be configured to determine or "learn" whether there are correlations among the temporal sequences of sensory events already represented in L4 of V2, shown as 542. Such correlations may be weak compared to the correlations among individual events. As a result, L2/3 of V2, shown as 528 may learn to group together sequences of sequences 544. If the embodiment includes additional levels of similar hierarchy, this process may repeat as signals ascend the hierarchy to another module, where the process may be repeated.

Further embodiments of the present invention may be configured to communicate the sensory events from L2/3 of V1, shown as 518, into layer 5 of V1—or "L5 of V1" and shown as 514. The embodiment may be configured such that the sensory events received at L5 of V1, identified as 514, may be communicated to layer 6 of V1—or "L6 of V1" identifies as 512. L6 of V1 may be configured to become selective for individual sequence segments of the inputted sensory events, such as "ˆ(AB)", "ˆ(BC)" 534, etc. The signals received at L6 of V1, shown as 512, may activate nodes such as those that predict the occurrence of the next event entering layer 4, shown as 536. This prediction may be denoted by a grey event, such as "B", and the fact that the prediction is based on the recognition of a given sequence fragment is denoted by a pointer to a sequence including the prediction, such as "^(AB)".

These predictions may be communicated from L6 of V1, shown as 512 into L4 of V1, shown as 516. This communication may serve as a kind of auto-encoder (Hinton, G. E. and R. R. Salakhutdinov (2006). "Reducing the dimensionality of data with neural networks." Science 313(5786): 504-507.). Specifically, L6 nodes will learn to correctly predict upcoming events arriving in layer 4 using a process of trial-and-error with reinforcement. Initially, connections from L2/3 into L5 will be random, and connections from L5 to L6 will be random. When a node in L6 happens to be active just before a node in L4 receives an input, then the weight from L6 to L4 will be strengthened through a process of Hebbian plasticity. In addition, the synapses from an L5 node that caused an L6 node to activate may also be strengthened using a backpropagation rule (Chauvin, Y. and D. E. Rumelhart (1995). "Backpropagation: Theory, Architectures, and Applications."). Similarly, the synapses from L2/3 onto L5 may also be strengthen by backpropagation. Using these learning rules, nodes in L6 will learn to correctly predict the next event arriving in L4.

Such inputs from L6 to L4 may be used to: i) reinforce input from the sensor 532, helping to drive L4 nodes more strongly; ii) help to instruct L4 about which events within a sensory event provided by the sensor, represents using single nodes; and, iii) help to instruct L4 to develop persistent activity for a given event.

The predictions prepared at L6 of V2, shown as 522 in FIG. 5, may be communicated "down" the hierarchy to L2/3, shown as 518, of the previous level, V1. For example, predictions from L6 of V2, shown as 540, are communicated to L2/3 of V1, shown as 518. Similar to the input from L6 to L4, shown as 522 and 526, respectively, these synapses will be adjusted using Hebbian plasticity to help the L6 node learn to correctly predict the occurrence of temporal sequences encoded by L2/3 nodes of V1. Furthermore, synapses from L5 of V2, shown as 524 to L6 of V2, shown as 522, will be adjusted via backpropagation, as will synapses from L2/3 of V2, shown as 528 to L5 of V2, shown as 524. This plasticity will help the L6 node learn to make correct predictions.

The predictions that are communicated from L6 of V2, identified as 522, to L2/3 of V1, identified as 518, may serve to: i) reinforce input from the lower level L4, that is, L4 of V1, helping to drive L2/3 nodes more strongly; ii) help to instruct L2/3 about which sequences within the lower L4 population—that is, the V1 layer—to represent; iii) endow L2/3 nodes with a form of pattern completion, where the node can still respond if one element of the temporal sequence was absent or modified.

Figure 6:
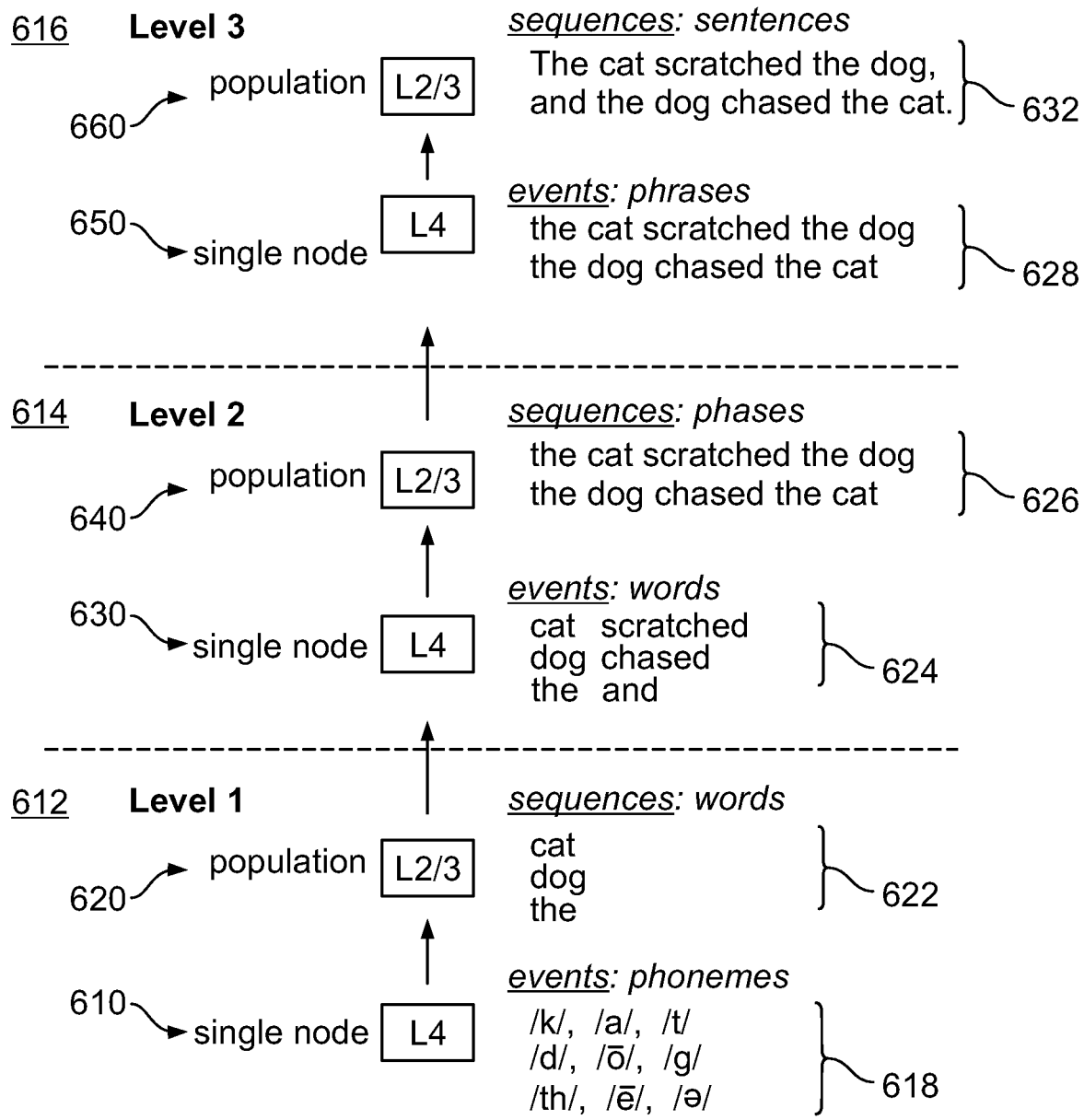
FIG. 6 illustrates a flow diagram showing the operation of an added embodiment of the present invention.

FIG. 6 illustrates the operation of an embodiment of the system in the context of sounds, such as words. More specifically, the input stream consists of sound pressure measured, for example, by a set of microphones or other suitable instrument, which characterize an auditory environment that includes speech from multiple humans, such as at a cocktail party. This input stream may be converted into a spectrogram for each microphone, and then transduced into a population code. Within this population code, different clusters represent different individual auditory events in speech—termed "phonemes". After sufficient time for the input weights into layer 4, identified in FIG. 6 as 610, to reach a steady-state of their learning rule (e.g. Hebbian learning rule), individual nodes in L4 learn to respond to individual phonemes (among other auditory features).

L2/3 of level 1, identified as 620 in FIG. 6, may be configured to receive information from L4, identified as 610, and identify temporal sequences of phonemes that occur together with strong correlation across time. Such grouping of phonemes into sequences may identify words 622. The individual nodes in L2/3, identified as 620, may respond to multiple words, and each word may activate multiple L2/3 nodes, identified as 620. However, the population code within L2/3, identified as 620, may again have clusters and each cluster may correspond to an individual word.

The embodiment of the system shown in FIG. 6 may be configured to communicate signals to L4 of level 2, shown as 630. L4 may process the input by feedforward synaptic weights to convert the collective mode of activity representing a word into activation of a single node in L4 level 2, shown as 630. Because a word 624 may be a temporal sequence of phonemes, it necessarily has longer duration than each phoneme. Thus, the illustrated embodiment is configured such that the temporal duration of the primary events represented in L4 increases as signals move up the hierarchy.

The signals may further be communicated from L4 of level 2, shown as 630 in FIG. 6, to L2/3 of level 2, shown as 640. This level may be configured to develop correlations between words to produce recognition of temporal sequences of words, namely "phrases" 626. which may be represented as collective modes of population activity.

Signals from L2/3 of level 2, and shown as 640, may be communicated into L4 of level 3, where individual nodes may encode an individual phrase 628.

L2/3 of level 3, shown as 660, may receive signals from L4 of level 3, shown as 650, to assemble sequences among the phrases into sentences 632.

In modules still further up the hierarchy (not illustrated), individual L4 nodes may represent the speech from one individual speaker within the auditory environment, such that an individual speech stream may correspond to a specific speaker.

Figure 7:
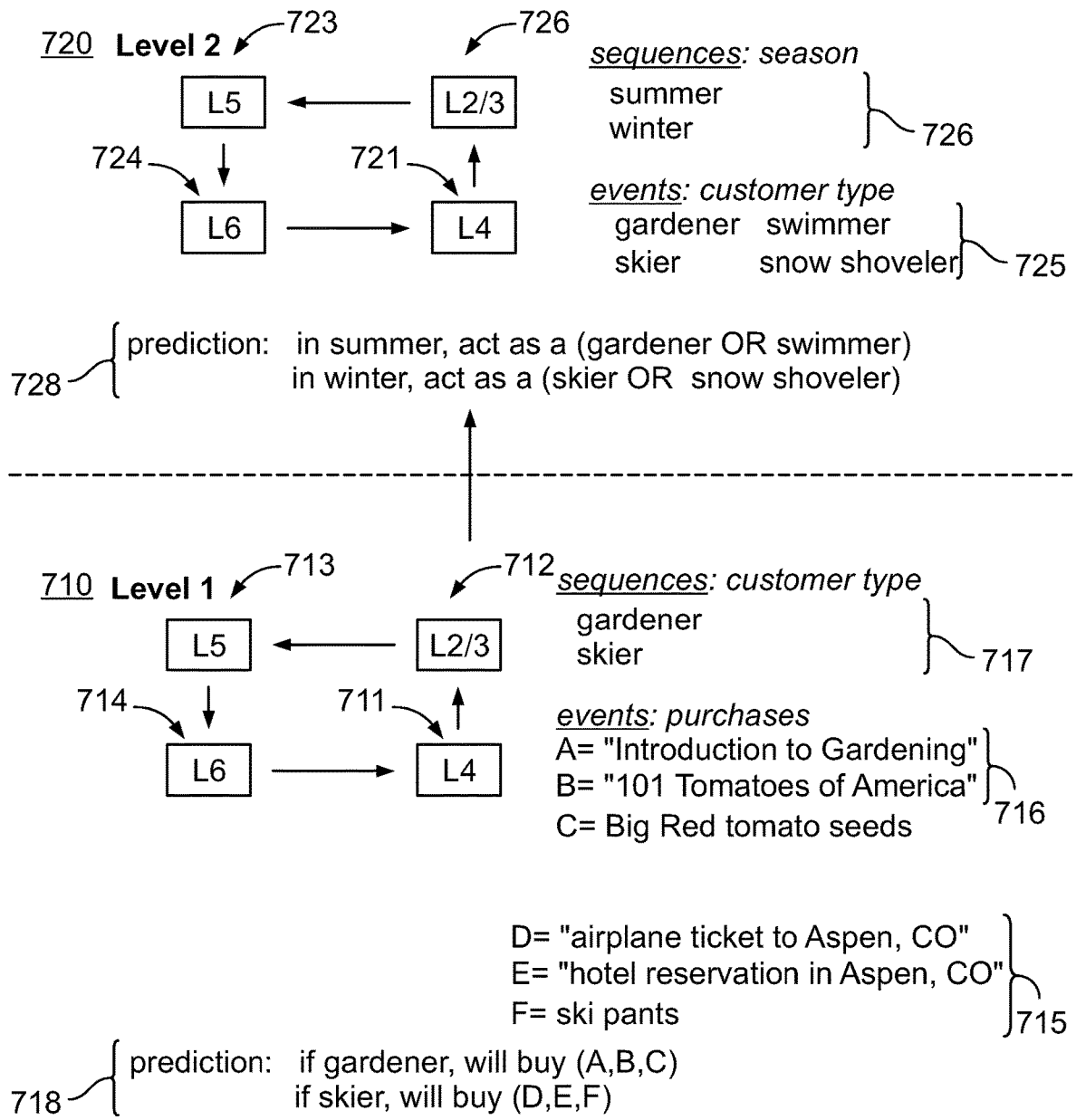
FIG. 7 illustrates a flow diagram showing the operation of an added embodiment of the present invention.

FIG. 7 illustrates certain embodiments of the invention that may be used to predict, for example, individual purchasing events. An individual purchasing event may include any consumer goods, for example, purchases of books ("Introduction to Gardening"), products (tomato seeds), services (airplane tickets), etc. Individual customers tend to purchase related items that produce correlated sequences of purchases. For instance, a gardener will buy a different set of products than a skier.

The individual purchasing events 715, 716 may be received as inputs at L4, indicated by 711. Therefore, an embodiment of a system of the invention may be configured such that information from L4 of level 1, indicated by 711 is communicated to L2/3 of level 1, indicated by 712, at which temporal correlations among purchasing events define purchasing sequences, which, in this example, are labeled as customer types 717.

Layer 2/3 of level 1, indicated by 712, may communicate signals to L5 of level 1, indicated by 713, which then sends the signal into L6 of level 1, indicated by 714. The system may also be configured to use information about the customer type of a given individual to make predictions about the individual's next purchase. For example, if an individual has previously purchased gardening books, then they may be more likely to be a gardener, and if they are a gardener, that individual may want to purchase "Big Red" tomato seeds 718.

An individual may appear as different customer types across time and exhibit broad purchasing patterns. For example, during warmer time periods (e.g. summer), individuals may be more likely to act as gardeners or swimmers, and less likely to appear as skiers or snow shovelers. In colder time periods (e.g. winter), the reverse may be true. Given these likelihoods, L4 of level 2, indicated by 721 may be configured to represents customer types within single nodes, which allows L2/3 of level 2, indicated by 726, to recognize sequences of customer types, which in this illustrated example correspond to seasons of the year 726. Signals may feed through L5 and L6 of level 2, indicated by 723 and 724, respectively, which may produce a prediction based on the season. For instance, if it is the summer, then an individual who has acted like a gardener will be more likely to next act as a swimmer (and less likely to act as a skier or snow shoveler).

Figure 8:
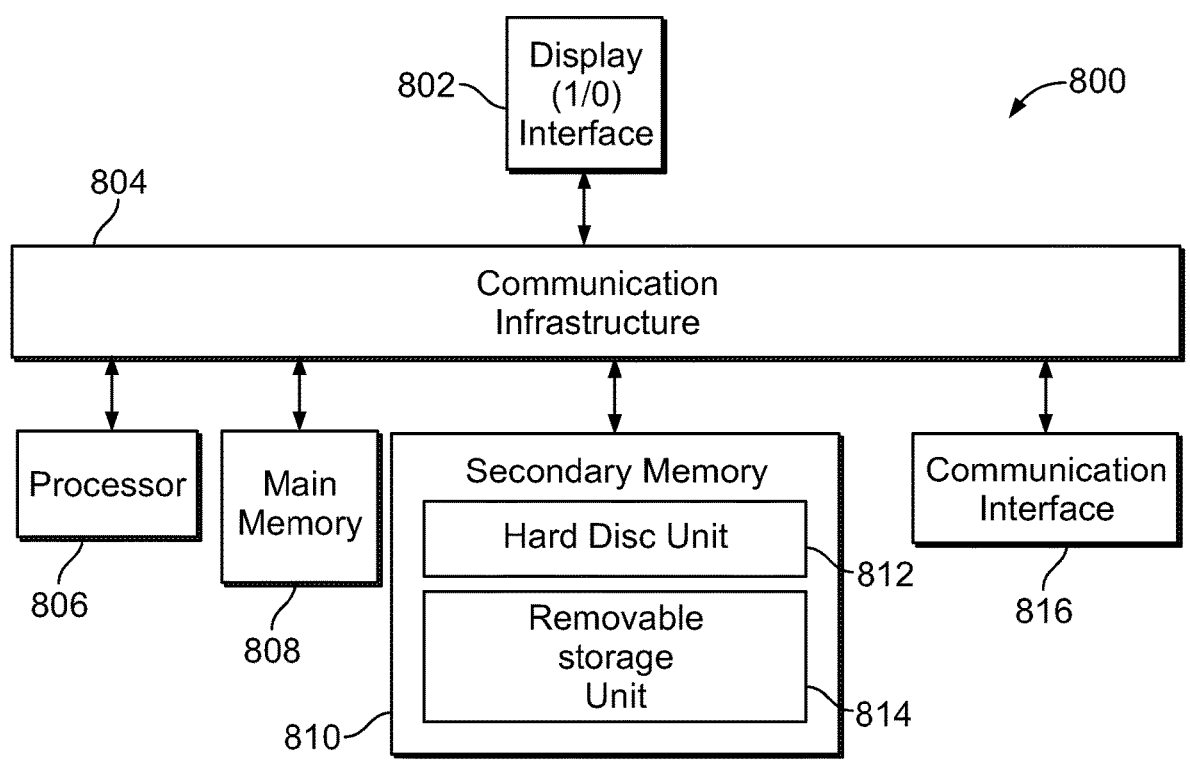
FIG. 8 is a schematic view of a computing system according to one preferred embodiment of the present invention.

FIG. 8 illustrates an exemplary computer system 800 that may be used to implement the methods according to the invention. One or more computer systems 800 may carry out the methods presented herein as computer code.

Computer system 800 includes an input/output display interface 802 connected to communication infrastructure 804—such as a bus—which forwards data such as graphics, text, and information, from the communication infrastructure 804 or from a frame buffer (not shown) to other components of the computer system 800. The input/output display interface 802 may be, for example, a keyboard, touch screen, joystick, trackball, mouse, monitor, speaker, printer, any other computer peripheral device, or any combination thereof, capable of entering and/or viewing data.

Computer system 800 includes one or more processors 806, which may be a special purpose or a general-purpose digital signal processor that processes certain information. Computer system 800 also includes a main memory 808, for example random access memory ("RAM"), readonly memory ("ROM"), mass storage device, or any combination of tangible, nontransitory memory. Computer system 800 may also include a secondary memory 810 such as a hard disk unit 812, a removable storage unit 814, or any combination of tangible, nontransitory memory. Computer system 800 may also include a communication interface 816, for example, a modem, a network interface (such as an Ethernet card or Ethernet cable), a communication port, a PCMCIA slot and card, wired or wireless systems (such as Wi-Fi, Bluetooth, Infrared), local area networks, wide area networks, intranets, etc.

It is contemplated that the main memory 808, secondary memory 810, communication interface 816, or a combination thereof, function as a computer usable storage medium, otherwise referred to as a computer readable storage medium, to store and/or access computer software including computer instructions. For example, computer programs or other instructions may be loaded into the computer system 800 such as through a removable storage device, for example, a floppy disk, ZIP disks, magnetic tape, portable flash drive, optical disk such as a CD or DVD or Blu-ray, Micro-Electro-Mechanical Systems ("MEMS"), nanotechnological apparatus. Specifically, computer software including computer instructions may be transferred from the removable storage unit 814 or hard disc unit 812 to the secondary memory 810 or through the communication infrastructure 804 to the main memory 808 of the computer system 800.

Communication interface 816 allows software, instructions and data to be transferred between the computer system 800 and external devices or external networks. Software, instructions, and/or data transferred by the communication interface 816 are typically in the form of signals that may be electronic, electromagnetic, optical, or other signals capable of being sent and received by the communication interface 816. Signals may be sent and received using wire or cable, fiber optics, a phone line, a cellular phone link, a Radio Frequency ("RF") link, wireless link, or other communication channels.

Computer programs, when executed, enable the computer system 800, particularly the processor 806, to implement the methods of the invention according to computer software including instructions.

The computer system 800 described herein may perform any one of, or any combination of, the steps of any of the methods presented herein. It is also contemplated that the methods according to the invention may be performed automatically, or may be invoked by some form of manual intervention.

The computer system 800 of FIG. 8 is provided only for purposes of illustration, such that the invention is not limited to this specific embodiment. It is appreciated that a person skilled in the relevant art knows how to program and implement the invention using any computer system.

The computer system 800 may be a handheld device and include any small-sized computer device including, for example, a personal digital assistant ("PDA"), smart handheld computing device, cellular telephone, or a laptop or netbook computer, hand held console or MP3 player, tablet, or similar hand held computer device, such as an iPad®, iPad Touch® or iPhone®.

Figure 9:
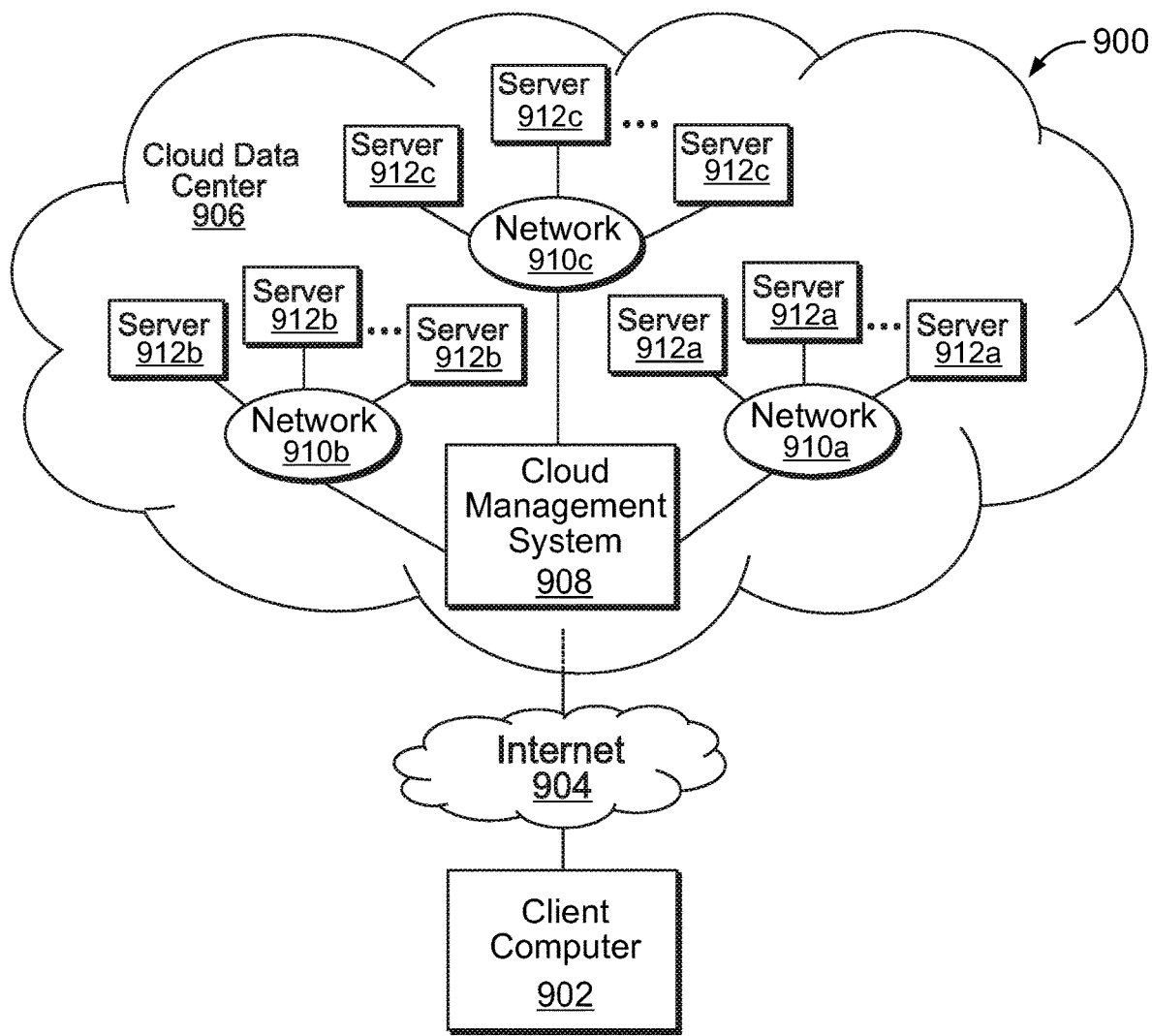
FIG. 9 is a schematic view of an exemplary cloud computing system according to one preferred embodiment of the present invention.

Separate and apart from, or in addition to, computer system 800, the methods according to the invention may be implemented using a cloud computing system. FIG. 9 illustrates an exemplary cloud computing system 950 that may be used to implement the methods according to the present invention. The cloud computing system 950 includes a plurality of interconnected computing environments. The cloud computing system 950 utilizes the resources from various networks as a collective virtual computer, where the services and applications can run independently from a particular computer or server configuration making hardware less important.

Specifically, the cloud computing system 950 includes at least one client computer 952. The client computer 952 may be any device through the use of which a distributed computing environment may be accessed to perform the methods disclosed herein, for example, a traditional computer, portable computer, mobile phone, personal digital assistant, tablet to name a few. The client computer 952 includes a processor and memory such as random access memory ("RAM"), read-only memory ("ROM"), mass storage device, or any combination thereof as described more fully in reference to FIG. 8.

The client computer 952 also includes a communications interface, for example, a modem, a network interface (such as an Ethernet card), a communications port, a PCMCIA slot and card, wired or wireless systems, etc. The communications interface allows communication through transferred signals between the client computer 952 and external devices including networks such as the Internet 954 and cloud data center 956. Communication may be implemented using wireless or wired capability such as cable, fiber optics, a phone line, a cellular phone link, radio waves or other communication channels.

The client computer 952 establishes communication with the Internet 954—specifically to one or more servers—to, in turn, establish communication with one or more cloud data centers 956. A cloud data center 956 includes one or more networks 960*a*, 960*b*, 960*c* managed through a cloud management system 958. Each network 960a, 960b, 960c includes resource servers 962a, 962b, 962c, respectively. Servers 962a, 962b, 962c permit access to a collection of computing resources and components that can be invoked to instantiate a virtual computer, process, or other resource for a limited or defined duration. For example, one group of resource servers can host and serve an operating system or components thereof to deliver and instantiate a virtual computer. Another group of resource servers can accept requests to host computing cycles or processor time, to supply a defined level of processing power for a virtual computer. A further group of resource servers can host and serve applications to load on an instantiation of a virtual computer, such as an email client, a browser application, a messaging application, or other applications or software.

The cloud management system 958 can comprise a dedicated or centralized server and/or other software, hardware, and network tools to communicate with one or more networks 960a, 960b, 960c, such as the Internet or other public or private network, with all sets of resource servers 962a, 962b, 962c. The cloud management system 958 may be configured to query and identify the computing resources and components managed by the set of resource servers 962a, 962b, 962c needed and available for use in the cloud data center 956. Specifically, the cloud management system 958 may be configured to identify the hardware resources and components such as type and amount of processing power, type and amount of memory, type and amount of storage, type and amount of network bandwidth and the like, of the set of resource servers 962a, 962b, 962c needed and available for use in the cloud data center 956. Likewise, the cloud management system 958 can be configured to identify the software resources and components, such as type of Operating System ("OS"), application programs, and the like, of the set of resource servers 962a, 962b, 962c needed and available for use in the cloud data center 956.

The present invention is also directed to computer products, otherwise referred to as computer program products, to provide software to the cloud computing system 950. Computer products store software on any computer useable medium, known now or in the future. Such software, when executed, may implement the methods according to certain embodiments of the invention. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, Micro-Electro-Mechanical Systems ("MEMS"), nanotechnological storage device, etc.), and communication mediums (e.g., wired and wireless communications networks, local area networks, wide area networks, intranets, etc.). It is to be appreciated that the embodiments described herein may be implemented using software, hardware, firmware, or combinations thereof.

The cloud computing system 950 of FIG. 9 is provided only for purposes of illustration and does not limit the invention to this specific embodiment. It is appreciated that a person skilled in the relevant art knows how to program and implement the invention using any computer system or network architecture.

While the disclosure is susceptible to various modifications and alternative forms, specific exemplary embodiments of the present invention have been shown by way of example in the drawings and have been described in detail. It should be understood, however, that there is no intent to limit the disclosure to the particular embodiments disclosed, but on the contrary, the intention is to cover all modifications, equivalents, and alternatives falling within the scope of the disclosure as defined by the appended claims.

The invention claimed is:

1. A method for facilitating pattern recognition through use of analysis by a plurality of layers organized into at least one module to form a hierarchy, the method comprising:
   collecting information through use of one or more sensors in the form of a time series for each of the one or more sensors;
   processing the each of the one or more time series using one or more overlapping filtering functions to encode the each of the one or more time series redundantly into a binary code to produce a population code, the population code including one or more clusters, wherein each of the one or more clusters comprises a set of many population activity patterns;
   communicating through a network of connections the information to a first layer in the at least one module at which the information is initially analyzed to identify one or more clusters in the input population code, wherein each cluster represents a sensory event, wherein said initially analyzing step applies a learning rule to the input population code such that each node in a first population of nodes in the first layer is activated by one or more clusters;
   upon activation of the node in the first population of nodes in the first layer, transferring the each of the one or more clusters, via one or more synapses, to a second layer in the at least one modules at which the each of the one or more clusters are evaluated to determine one or more temporal sequences, wherein the second layer of the at least one modules comprises a second population of nodes, wherein each node of the second population of nodes is connected to at least a second node in the second population of nodes through at least one recurrent synapse, wherein the at least one recurrent synapse operates using a plasticity rule, wherein one or more nodes in the second population of nodes is activated by one or more temporal sequences of sensory events represented in the first layer;
   transferring the one or more sequences from the second layer of the at least one module to a third layer in the at least one module to compute sequence predictions, wherein the sequence predictions are fed back into the first layer of the of the at least one modules to enhance an activity of correct predictions of the next sensory event in the sequence, wherein the sequence predictions are also fed back to a second layer of a second module one step down in the hierarchy; and
   distributing the one or more sequences from the second layer of the at least one modules to a first layer of a second module at a next level in the hierarchy.

2. The method of claim 1, wherein the plasticity rule operates via an unsupervised learning rule.

3. The method of claim 2, wherein the unsupervised learning rule comprises spike-timing dependent plasticity that strengthens synapses when nodes are active in the causal order and weakens them otherwise.

4. The method of claim 1, further comprising the step of learning the one or more temporal sequences in the second layer enhanced by having dynamics of a recurrent network possess a general short-term memory for previous inputs.

5. The method of claim 1, further comprising the step of learning to translate the one or more temporal sequences in the second layer into a prediction of the next input event in the third layer is carried out by a combination of: i) random connections from layer 2 into layer 3 with high connectivity;

ii) random connections from layer 3 into layer 1 with high connectivity; iii) an unsupervised learning rule in the synapses from layer 3 onto layer 1, such as spike-timing dependent plasticity, that strengthens synapses when nodes are active in the causal order and weakens them otherwise.

6. The method of claim 5, wherein the learning step is further enhanced by a learning rule, such as backpropagation, that enhances the synapses connecting layer 2 onto a node in layer 3 whenever that same node in layer 3 had its synapses onto layer 1 strengthened.

7. A method for pattern recognition comprising the steps of:
   providing a neural network comprising a plurality of modules to form a hierarchy, each of the plurality of modules comprising layers of nodes;
   collecting information through use of one or more sensors in the form of a time series for each sensor;
   processing the time series for each sensor using one or more overlapping filtering functions to encode each time series redundantly into a binary code to produce a population code;
   collecting one or more first clusters of sensor data through use of the one or more sensors in the form of multiple sets of sensory values, which are then converted into time series by moving the location of all filter functions together within each set of sensors values with motion that is at least in part continuous motion;
   receiving by a first layer of nodes an input comprising the one or more first clusters of sensor data, wherein each cluster is a set of activity patterns that represent a sensory event;
   applying a learning rule to the set of activity patterns of the one or more first clusters of sensor data activating one or more nodes of the first layer of nodes;
   passing to a second layer of nodes from the activated nodes of the first layer of nodes the one or more first clusters of sensor data regarding activity patterns;
   identifying one or more temporal sequences of sensory events from the one or more passed clusters of sensor data activating one or more nodes of the second layer of nodes;
   communicating to a third layer of nodes from the activated nodes of the second layer of nodes one or more second clusters of sensor data regarding temporal sequences of sensory events;
   computing sequence predictions of a subsequent sensory event of the one or more second clusters of sensor data; and
   delivering and distributing the sequence predictions from the third layer of nodes to another layer of nodes, including nodes at a next level in the hierarchy.

8. The method for pattern recognition according to claim 7, wherein the input is a population code produced by encoding data by a set of filter functions in a redundant, overlapping binary code.

9. The method for pattern recognition according to claim 7, wherein the identifying step further comprises the steps of:
   using a plasticity rule to activate recurrent synapses; and
   producing temporal sequences.

10. The method for pattern recognition according to claim 7, wherein the sequence predictions are delivered from the third layer of nodes to the first layer of nodes.

11. The method for pattern recognition according to claim 7, wherein the sequence predictions are delivered from the third layer of nodes to the second layer of nodes.

12. The method for pattern recognition according to claim 7, wherein the nodes of each layer are interconnected via recurrent synapses.

13. A method for pattern recognition comprising the steps of:
   providing a neural network comprising a plurality of modules to form a hierarchy, each of the plurality of modules comprising layers of nodes;
   collecting information through use of one or more sensors;
   receiving by a first layer of nodes an input comprising one or more first clusters of sensor data, wherein each cluster is a set of activity patterns that represent a sensory event;
   applying a learning rule to the set of activity patterns of the one or more first clusters of sensor data activating one or more nodes of the first layer of nodes;
   passing to a second layer of nodes from the activated nodes of the first layer of nodes the one or more first clusters of sensor data regarding activity patterns;
   identifying one or more temporal sequences of sensory events from the one or more passed clusters of sensor data activating one or more nodes of the second layer of nodes;
   communicating to a third layer of nodes from the activated nodes of the second layer of nodes one or more second clusters of sensor data regarding temporal sequences of sensory events;
   computing sequence predictions of a subsequent sensory event of the one or more second clusters of sensor data;
   distributing the sequence predictions from the third layer of nodes to another layer of nodes; and
   collecting the one or more first clusters of sensor data through use of the one or more sensors in the form of multiple sets of sensory values, which are then converted into time series by moving the location of all filter functions together within each set of sensors values with motion that is at least in part continuous motion.

14. The method for pattern recognition according to claim 13, wherein the input is a population code produced by encoding data by a set of filter functions in a redundant, overlapping binary code.

15. The method for pattern recognition according to claim 13, wherein the identifying step further comprises the steps of:
   using a plasticity rule to activate recurrent synapses; and
   producing temporal sequences.

16. The method for pattern recognition according to claim 7, wherein the sequence predictions are delivered from the third layer of nodes to the first layer of nodes, and from the third layer of nodes to the second layer of nodes and further wherein the nodes of each layer are interconnected via recurrent synapses.

17. The method of pattern recognition according to claim 13 further comprising the step of processing the time series for each sensor using one or more overlapping filtering functions to encode each time series redundantly into a binary code to produce a population code.

* * * * *